(12) United States Patent
Yonaha

(10) Patent No.: US 11,055,823 B2
(45) Date of Patent: Jul. 6, 2021

(54) IMAGE CORRECTION DEVICE, IMAGE CORRECTION METHOD, AND PROGRAM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 16/549,304

(22) Filed: Aug. 23, 2019

(65) Prior Publication Data

US 2019/0378245 A1 Dec. 12, 2019

Related U.S. Application Data

(63) Continuation of application No. PCT/JP2018/008124, filed on Mar. 2, 2018.

(30) Foreign Application Priority Data

Mar. 28, 2017 (JP) .............................. JP2017-063545

(51) Int. Cl.
*G06T 5/00* (2006.01)
*G06T 5/50* (2006.01)

(52) U.S. Cl.
CPC .............. *G06T 5/001* (2013.01); *G06T 5/006* (2013.01); *G06T 5/50* (2013.01); *G06T 2207/20021* (2013.01); *G06T 2207/20212* (2013.01)

(58) Field of Classification Search
CPC ........... G06T 5/001; G06T 5/006; G06T 5/50; G06T 2207/20021; G06T 2207/20212; G06T 3/4038; H04N 1/387; H04N 5/232
See application file for complete search history.

(56) References Cited

U.S. PATENT DOCUMENTS 10,366,477 B2 * 7/2019 Tsubota .................... G06T 3/00
2003/0184778 A1 10/2003 Chiba
(Continued)

FOREIGN PATENT DOCUMENTS

JP 2000-331151 A 11/2000
JP 2003-527661 A 9/2003
(Continued)

OTHER PUBLICATIONS

Content-Aware Image Retargeting with Controlled Distortion for Small Displays (Year: 2016).*
(Continued)

*Primary Examiner* — Nizar N Sivji
(74) *Attorney, Agent, or Firm* — Studebaker & Brackett PC

(57) ABSTRACT

Provided are an image correction device, an image correction method, and a program capable of canceling accumulated error at the time of connection from a wide field-of-view image in which a plurality of partial images are connected. An image correction device includes an image acquisition unit 22 that acquires a combined image including a plurality of partial images obtained by performing division imaging on a rectangular area in a real space using an imaging device 12, an area specifying unit 34 that specifies a correction target area in the combined image corresponding to the rectangular area in the real space, a division unit 36 that divides the correction target area into a plurality of divided areas, and a geometric conversion unit 40 that converts each of the plurality of divided areas into a rectangle.

11 Claims, 11 Drawing Sheets

(56) References Cited

U.S. PATENT DOCUMENTS

| | | | |
|---|---|---|---|
| 2006/0120625 A1 | 6/2006 | Peleg et al. | |
| 2010/0220209 A1 | 9/2010 | Peleg et al. | |
| 2010/0253861 A1* | 10/2010 | Tomaru | G06T 3/4038 348/745 |
| 2014/0198108 A1* | 7/2014 | Sigal | G06T 13/40 345/474 |
| 2015/0097976 A1* | 4/2015 | Nakanishi | H04N 5/145 348/208.1 |
| 2019/0385285 A1* | 12/2019 | Chen | G06T 5/006 |

FOREIGN PATENT DOCUMENTS

| | | | |
|---|---|---|---|
| JP | 2003-288589 A | 10/2003 | |
| JP | 2004-021578 A | 1/2004 | |
| JP | 2010-245582 A | 10/2010 | |
| JP | 2014-236238 A | 12/2014 | |
| JP | 2016001781 A * | 1/2016 | H04N 9/3182 |
| JP | 2016-099235 A | 5/2016 | |
| WO | 2009090727 A1 | 7/2009 | |

OTHER PUBLICATIONS

Visual-Attention-based Thumbnail using Two-Stage GrabCut (Year: 2012).*

Richard Hartley et al., "Multiple View Geometry in Computer Vision," Second Edition, Cambridge University Press, New York, 2004, pp. 1-655.

The extended European search report issued by the European Patent Office dated Dec. 10, 2019, which corresponds to European Patent Application No. 18778354.3 and is related to U.S. Appl. No. 16/549,304.

International Search Report issued in PCT/JP2018/008124; dated May 22, 2018.

International Preliminary Report on Patentability and Written Opinion issued in PCT/JP2018/008124; dated Oct. 1, 2019.

* cited by examiner

IMAGE CORRECTION DEVICE, IMAGE CORRECTION METHOD, AND PROGRAM

CROSS-REFERENCE TO RELATED APPLICATIONS

The present application is a Continuation of PCT International Application No. PCT/JP2018/008124 filed on Mar. 2, 2018 claiming priority under 35 U.S.C. § 119(a) to Japanese Patent Application No. 2017-063545 filed on Mar. 28, 2017. Each of the above applications is hereby expressly incorporated by reference, in their entirety, into the present application.

BACKGROUND OF THE INVENTION

1. Field of the Invention

The present invention relates to an image correction device, an image correction method, and a program capable of canceling an accumulated error at the time of connection from a combined image in which a plurality of partial images are connected.

2. Description of the Related Art

In the related art, a technology of connecting a plurality of partial images obtained by performing division imaging on a subject to generate a wide field-of-view image (hereinafter also referred to as a "combined image") with high resolution.

JP2004-021578A and JP2003-288589A describe correcting image distortion of each partial image before connection (combination) of a plurality of partial images in order to connect a plurality of partial images with high accuracy. Specifically, for each partial image, image distortion of each partial image is corrected before connection through projective conversion in which an area that is originally a rectangle but is distorted is designated by a point or a line and the distorted area is converted to the original rectangle.

In JP2014-236238A describes designating four corner points of a subject (a soccer field) in a wide field-of-view image in order to convert a viewpoint position of a wide field-of-view image, and converting the viewpoint of the wide field-of-view image through affine conversion based on the four corners.

WO2009/090727 describes imaging a plurality of partial images obtained by a non-wide-angle camera with respect to a wide field-of-view image obtained by a wide-angle camera in order to display a wide field-of-view image with high resolution on a multi-display including a plurality of displays, dividing the wide field-of-view image (combined image) after projection into a plurality of rectangular areas matching an aspect ratio of a display, and causing each rectangular area to be displayed on each display.

SUMMARY OF THE INVENTION

It is assumed that a rectangular long subject as illustrated in FIG. 9 is divided into a plurality of times and imaged by an imaging device, and a plurality of partial images obtained by performing division imaging are connected to create one combined image. When imaging conditions (a tilt angle, a rotation angle, an imaging distance, and the like) of the division imaging are the same for a plurality of times of division imaging, and image distortion caused by the imaging device is eliminated or canceled, a combined image including a subject image accurately representing a shape of the subject in a real space is expected to be obtained. However, in practice, errors are accumulated in a process of connecting a plurality of partial images, and curvature occurs in the combined image as illustrated in FIG. 10. When rotation variation is not permitted in the connection process, it is possible to suppress the curvature of the combined image to some extent, but a step is generated still in a frame line that is to be originally linear in a subject image in the combined image as illustrated in FIG. 11. That is, a so-called "rattling" subject image different from an original rectangle is obtained.

JP2004-021578A and JP2003-288589A disclose a technology for correcting image distortion of each partial image before connection (combination), but does not disclose or suggest a technology for canceling an accumulated error at the time of connection from a wide field-of-view image in which a plurality of partial images have already been connected. Even when the technologies of JP2004-021578A and JP2003-288589A are applied to image processing of a long subject and image distortion correction is performed before connection, it is actually difficult to completely eliminate an accumulated error at the time of connection. That is, as illustrated in FIGS. 10 and 11, the accumulated error may be noticeable in the combined image of the long subject.

A technology of JP2014-236238A (a technology for converting a viewpoint position of a wide field-of-view image) and a technology of WO2009/090727 (a technology of displaying a wide field-of-view image on a multi-display including a plurality of displays) are not technologies for canceling an accumulated error at the time of connection. Therefore, the technologies cannot be combined with JP2004-021578A and JP2003-288589A (a technology for correcting image distortion of each partial image before connection).

An object of the present invention is to provide an image correction device, an image correction method, and a program capable of canceling an accumulated error at the time of connection from a combined image in which a plurality of partial images are connected.

In order to achieve the above-described object, an image correction device according to a first aspect of the present invention comprises an image acquisition unit that acquires a combined image including a plurality of partial images obtained by performing division imaging on a rectangular area in a real space using an imaging device; an area specifying unit that specifies a correction target area in the combined image corresponding to the rectangular area in the real space; a division unit that divides the correction target area into a plurality of divided areas; and a geometric conversion unit that converts each of the plurality of divided areas into a rectangle.

According to the aspect, since the combined image including the plurality of partial images obtained by performing division imaging a rectangular area in a real space is acquired, the correction target area in the combined image is specified, the correction target area is divided into a plurality of divided areas, and each of the divided areas is converted into a rectangle, it is possible to cancel an accumulated error at the time of connection from a wide field-of-view image in which a plurality of partial images have already been connected.

The image correction device according to a second aspect of the present invention comprises a display control unit that displays the combined image acquired by the image acquisition unit on a display screen, wherein the area specifying unit receives, for the combined image displayed on the display screen, a designation indicating a vertex or a side in the combined image corresponding to a vertex or a side of the rectangular area in the real space, and specifies the correction target area in the combined image. According to the aspect, it is possible to easily cancel an accumulated error at the time of connection by designating a place corresponding to the vertex or the side of the rectangular area in the real space while viewing the displayed combined image.

In the image correction device according to a third aspect of the present invention, the area specifying unit traces an edge of the correction target area in the combined image corresponding to an edge of the rectangular area in the real space on the basis of the designation. According to the aspect, it is possible to reliably cancel an accumulated error with a subject image to be originally rectangular with respect to the combined image as a correction target area only by designating some of vertexes (or some of sides) of the subject image.

In the image correction device according to a fourth aspect of the present invention, the division unit divides the correction target area into the plurality of divided areas on the basis of a result of the trace. According to this aspect, it is possible to reliably cancel an accumulated error in the correction target area by using a trace result of the correction target area.

In the image correction device according to a fifth aspect of the present invention, the combined image includes the plurality of partial images obtained by performing division imaging in a longitudinal direction of the rectangular area with a distance from the imaging device to the rectangular area or a size of field of view made constant, and the division unit divides the correction target area in a specific direction of the correction target area corresponding to a longitudinal direction of the rectangular area. According to the aspect, it is possible to cancel an accumulated error by using regularity at the time of imaging a partial image or a correction result at the time of connection of a plurality of partial images.

In the image correction device according to a sixth aspect of the present invention, the combined image includes the plurality of partial images obtained by performing division imaging in a longitudinal direction of the rectangular area with a distance from the imaging device to the rectangular area or a size of a field of view made different, and the division unit divides the correction target area with an aspect ratio of the plurality of divided areas made constant. According to this aspect, it is possible to cancel an accumulated error even when the distance from the imaging device to the rectangular area or the size of the field of view differ among the plurality of partial images.

In the image correction device according to a seventh aspect of the present invention, the division unit reduces a size of the divided area as the distance from the imaging device to the rectangular area increases or as the size of the field of view increases.

In the image correction device according to an eighth aspect of the present invention, in the combined image, the plurality of partial images are connected to each other while being partially superimposed on each other, and the division unit determines the divided area according to a size of the partial image and a size of a superimposed area for connection. According to the aspect, it is possible to perform division according to an image (a partial image) that is a combination source and the superimposed area, and to reliably cancel an accumulated image.

In the image correction device according to a ninth aspect of the present invention, the division unit divides the correction target area in the superimposed area of the partial image. According to the aspect, it is possible to perform easy and appropriate division by using the superimposed area at the time of connection (at the time of combination), and to reliably cancel an accumulated image.

In the image correction device according to a tenth aspect of the present invention, in the combined image, the plurality of partial images are geometrically converted and connected, and the division unit determines the plurality of divided areas on the basis of geometric conversion information used in the geometric conversion in the connection. According to the aspect, it is possible to perform easy and appropriate division using geometric conversion information at the time of connection (at the time of combination), and to reliably cancel an accumulated image.

An image correction method according to an eleventh aspect of the present invention comprises steps of: acquiring a combined image including a plurality of partial images obtained by performing division imaging on a rectangular area in a real space using an imaging device; specifying a correction target area in the combined image corresponding to the rectangular area in the real space; dividing the correction target area into a plurality of divided areas: and converting each of the plurality of divided areas into a rectangle.

A program according to a twelfth aspect relating to the present invention causes a computer to execute steps of acquiring a combined image including a plurality of partial images obtained by performing division imaging on a rectangular area in a real space using an imaging device; specifying a correction target area in the combined image corresponding to the rectangular area in the real space; dividing the correction target area into a plurality of divided areas: and converting each of the plurality of divided areas into a rectangle.

According to the present invention, it is possible to cancel an accumulated error at the time of connection from a combined image in which a plurality of images are connected.

DESCRIPTION OF THE PREFERRED EMBODIMENTS

Hereinafter, embodiments of an image correction device, an image correction method, and a program according to the present invention will be described using the accompanying drawings.

Figure 1:
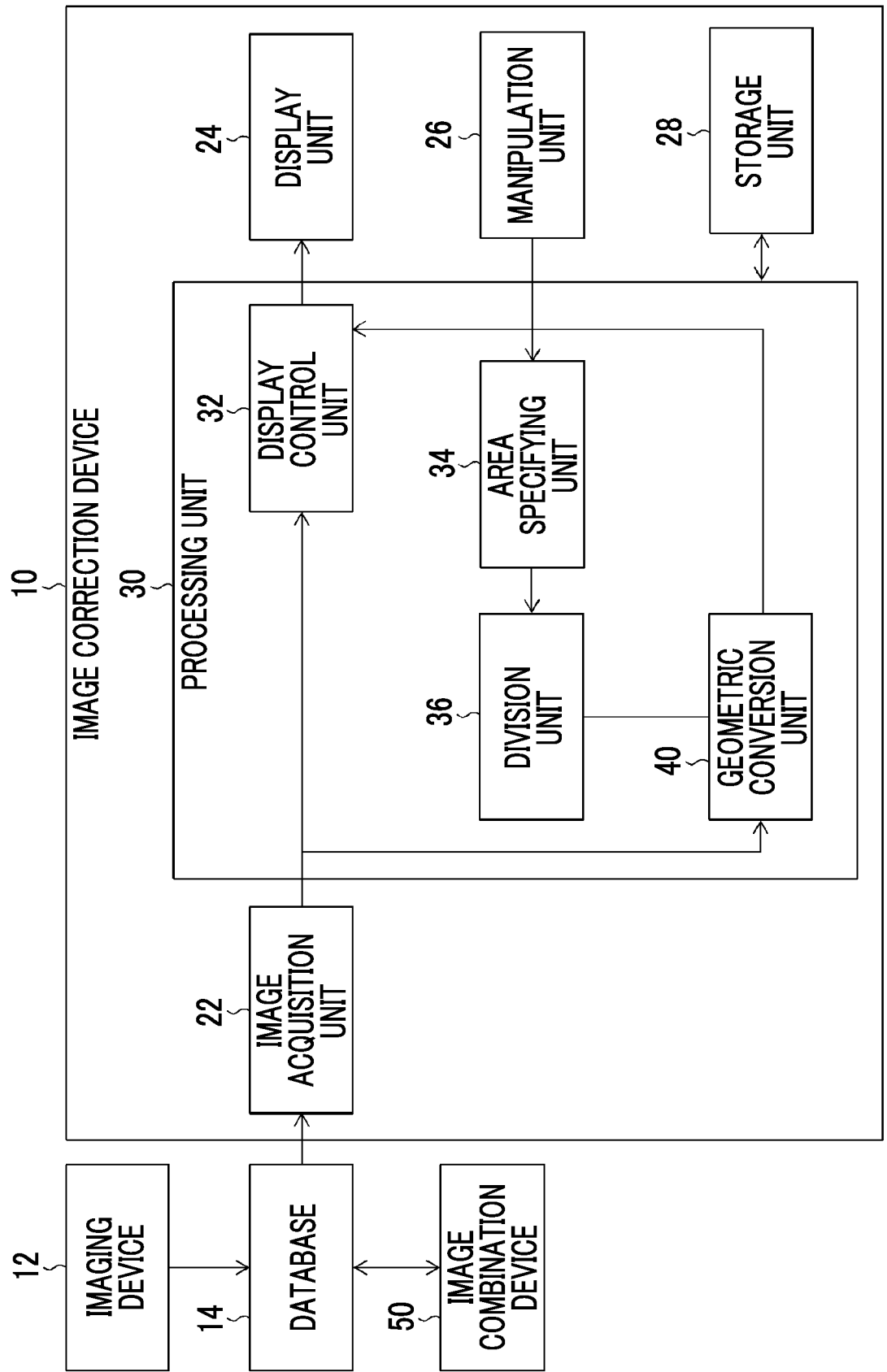
FIG. 1 is a block diagram illustrating an example of a configuration of an image correction device according to the present invention.

FIG. 1 is a block diagram illustrating an example of a configuration of an image correction device according to the present invention.

An image correction device 10 is configured by, for example, a computer device. The image correction device 10 according to the embodiment includes an image acquisition unit 22 that acquires a combined image including a plurality of partial images obtained by performing division imaging on a subject using an imaging device 12, a display unit 24 having a display screen capable of displaying an image, a manipulation unit 26 that receives a designation from a user, a storage unit 28 that stores a program and information needed for execution of the program, and a processing unit 30 that executes various processes according to the program.

The image acquisition unit 22 includes, for example, a communication device. The image acquisition unit 22 is not limited to a communication device that communicates with a database 14 via a network. The image acquisition unit 22 may be a communication device that directly communicates with the imaging device 12 through wired communication or wireless communication. The image acquisition unit 22 may be configured of an interface device with a recording medium such as a memory card.

The display unit 24 is configured of a display device such as a liquid crystal display device.

The manipulation unit 26 is configured of a manipulation device that can be manually manipulated.

The storage unit 28 is configured of a transitory storage device and a non-transitory storage device. A program is stored in the non-transitory storage device.

The processing unit 30 is configured of, for example, a central processing unit (CPU).

The processing unit 30 of the example includes a display control unit 32 that causes the combined image acquired by the image acquisition unit 22 to be displayed on the display screen of the display unit 24, an area specifying unit 34 that specifies a correction target area in the combined image corresponding to a rectangular subject (which is an aspect of the rectangular area in the real space), a division unit 36 that divides the correction target area specified by the area specifying unit 34 into a plurality of divided areas, and a geometric conversion unit 40 that converts each of the plurality of divisions divided by the division unit 36 into a rectangle.

Although the "rectangular area" in the present invention is not particularly limited, but is, for example, a revetment of a river or a lake. Hereinafter, although a long rectangular subject will be described as an example of the "rectangular area", the "rectangular area" is not particularly limited in such a case. The "rectangular area" may be, for example, an inner wall surface (curved surface) of a tunnel or a high bridge pier. In the present invention, "rectangle" may be a substantial rectangle. That is, in the present invention, the "rectangle" is not limited to a case in which an angle formed by two sides is a right angle, but a case in which the angle is approximately a right angle (in a predetermined allowable range, such as 80 degrees to 100 degrees) may be included.

An image combination device 50 is configured of, for example, a computer device. The image combination device 50 connects the partial images obtained by performing division imaging on a subject using the imaging device 12 to generate the combined image. The generated combined image is stored in the database 14 in this example.

The image combination device 50 of the example has a function of correcting each partial image before connecting the partial images. When a tilt angle (an angle between an imaging optical axis of the imaging device 12 and an imaged surface of the subject) differs between the partial images, the image combination device 50 of the example can perform image processing (a tilt angle correction process) that is the same as in a case in which the tilt angle is constant between the partial images, on each partial image before a connection. Further, when a rotation angle (an angle around the imaging optical axis of the imaging device 12) differs between the partial images, the image combination device 50 of the example can perform image processing that is the same as in a case in which the rotation angle is constant between the partial images (a rotation angle correction process), on each partial image before a connection. Further, when an imaging distance (which is a distance between the imaging device 12 and the subject at the time of imaging) differs between the partial images, the image combination device 50 of the example can perform image processing that is the same as in a case in which the imaging distance is constant between the partial images, (a distance correction process) on each partial image before a connection. The tilt angle correction process, the rotation angle correction process, and the distance correction process can be performed using known technologies. Further, the distance correction process, the tilt angle correction process, and the rotation angle correction process do not need to be performed as separate processes and can be performed in one projective conversion process.

Figure 2:
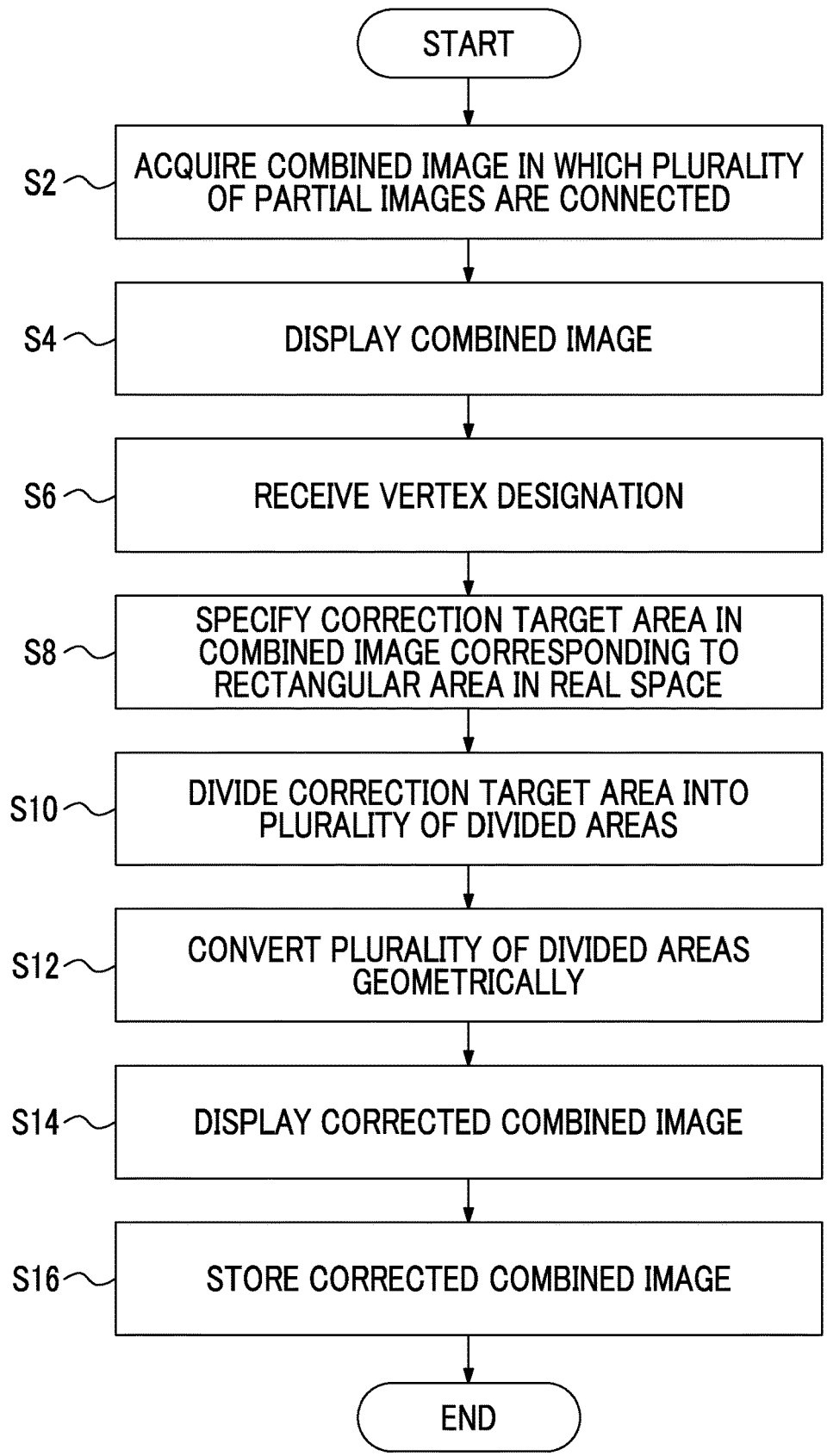
FIG. 2 is a flowchart illustrating a flow of an example of an image correction process to which an image correction method according to the present invention is applied.

FIG. 2 is a flowchart illustrating a flow of an example of an image correction process to which an image correction method according to the present invention is applied. The present process is executed under the control of the processing unit 30 according to the program stored in the storage unit 28.

Figure 3:
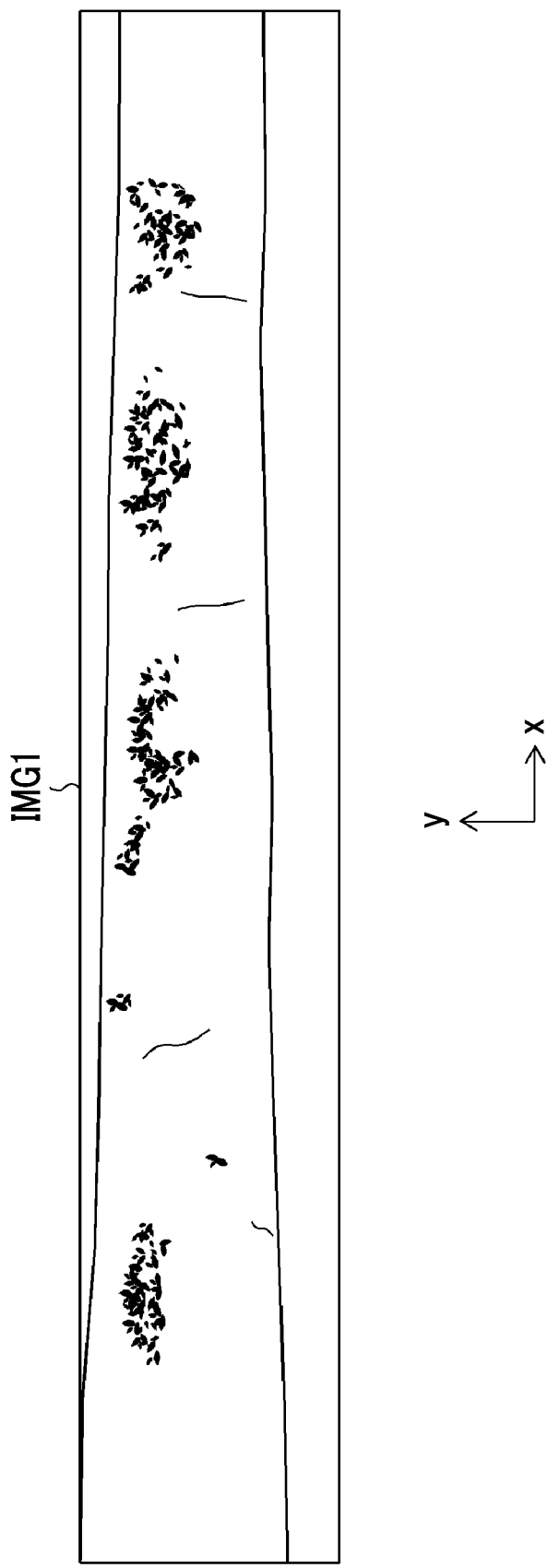
FIG. 3 is a diagram illustrating an example of a combined image.
Figure 4:
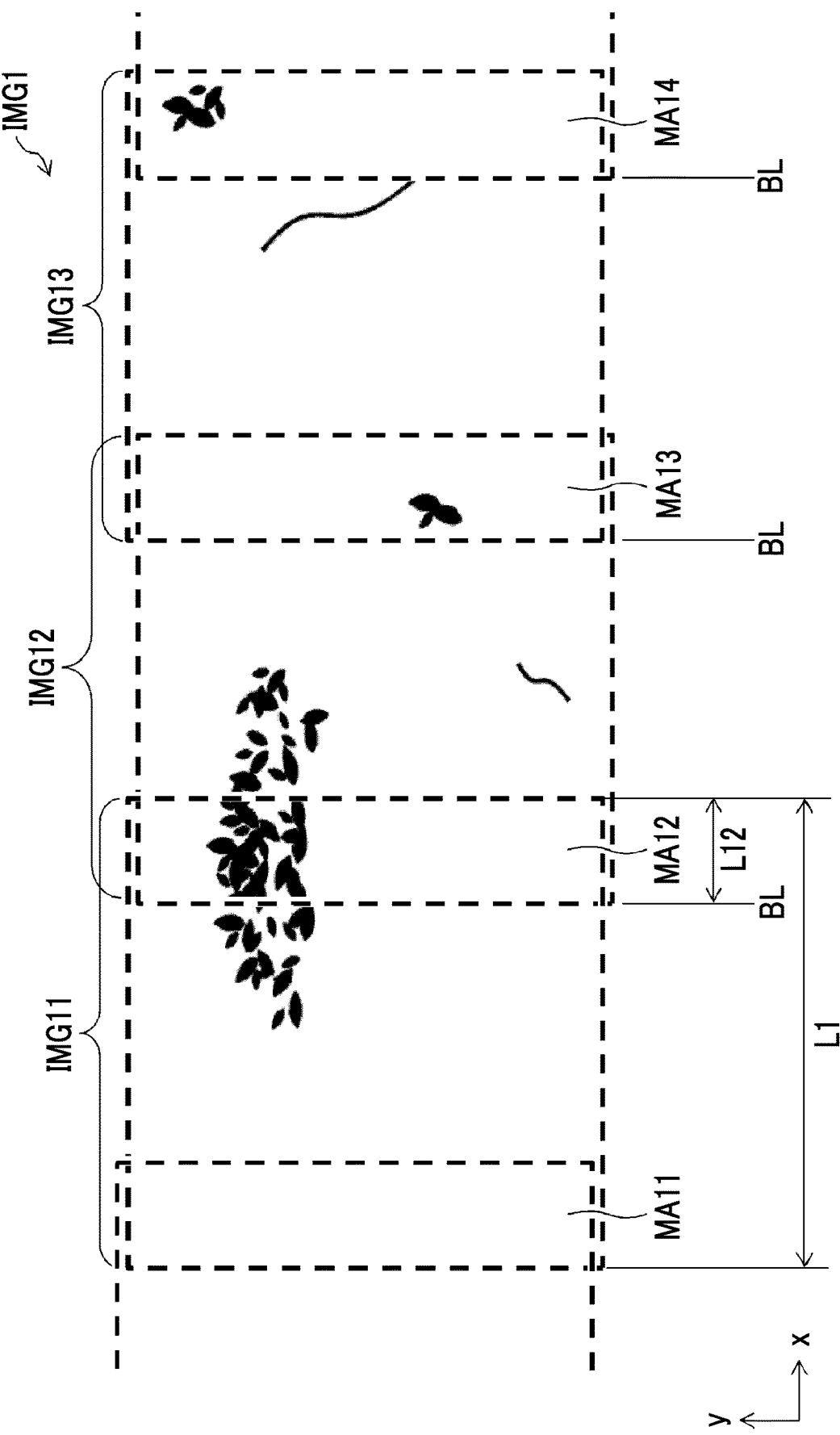
FIG. 4 is an illustrative diagram of a combination (a connection of partial images).

First, the image acquisition unit 22 acquires a combined image (a wide field-of-view image) in which a plurality of partial images are connected, from the database 14 (step S2). FIG. 3 is a diagram illustrating an example of the combined image. The partial images constituting this combined image IMG1 are images obtained by performing division imaging on a long rectangular subject (which is one form of a rectangular area in a real space) using the imaging device 12. A portion of the combined image IMG1 illustrated in FIG. 3 is illustrated in FIG. 4. Dotted lines in FIG. 4 indicate partial images IMG11, IMG12, and IMG13. The partial images IMG11 to IMG13 are connected to each other while being partially superimposed on each other. The superimposed areas MA11, MA12, MA13, and MA14 for connection in the image may be referred to as "sticking" (pasting area) or a "margin".

Then, the display control unit 32 displays the combined image IMG1 on the display screen of the display unit 24 (step S4).

Figure 5:
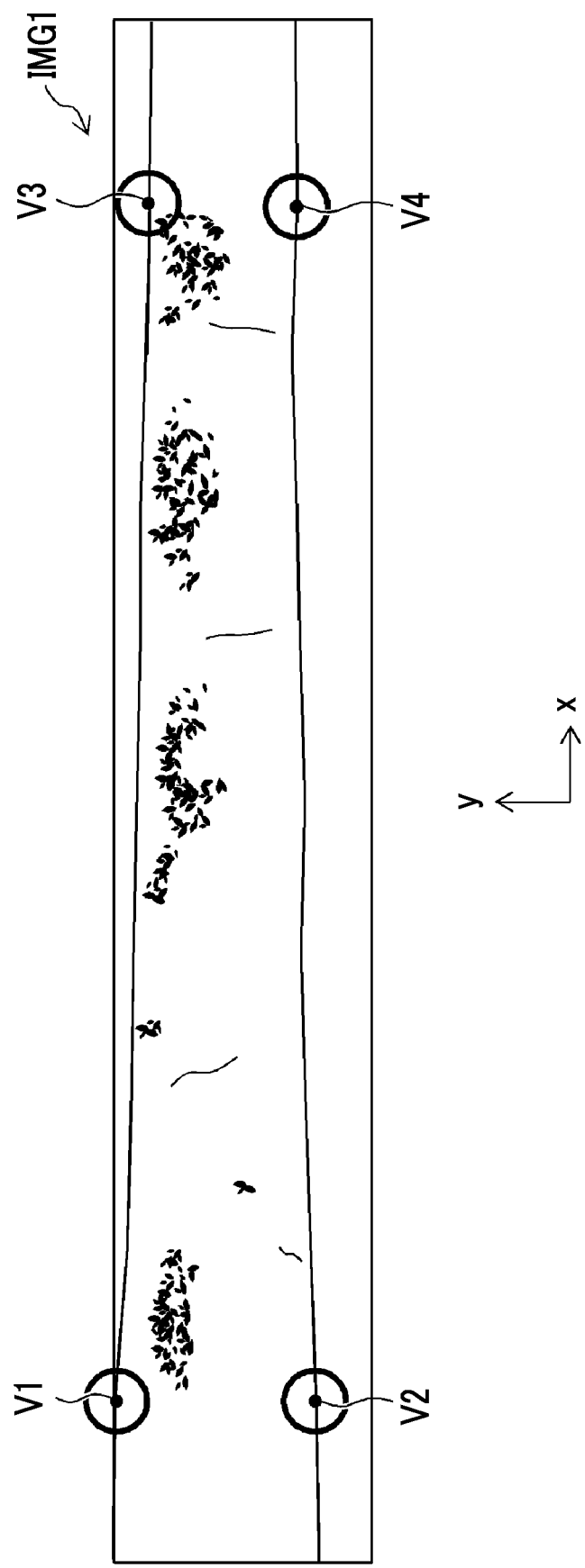
FIG. 5 is an illustrative diagram of vertex designation.

Then, a designation (an apex designation) indicating positions of points V1, V2, V3, and V4 in the combined image corresponding to vertexes of the rectangular area in the real space for the combined image IMG1 displayed on the display screen of the display unit 24, as illustrated in FIG. 5, is received using the manipulation unit 26 (step S6). Further, although the case in which a designation of four points V1 to V4 corresponding to four vertices of the rectangular area in the real space is received has been shown, a designation of three points (for example, the points V1 to V3) or two points (for example, the points V1 and V2) may be received. Further, although the case in which the vertex designation is received has been shown, a designation (a side designation) of at least two of the sides (LS1 to LS4 illustrated in FIG. 6) in the combined image corresponding to the sides (also referred to as "line segments") of the rectangular area in the real space may be received.

Figure 6:
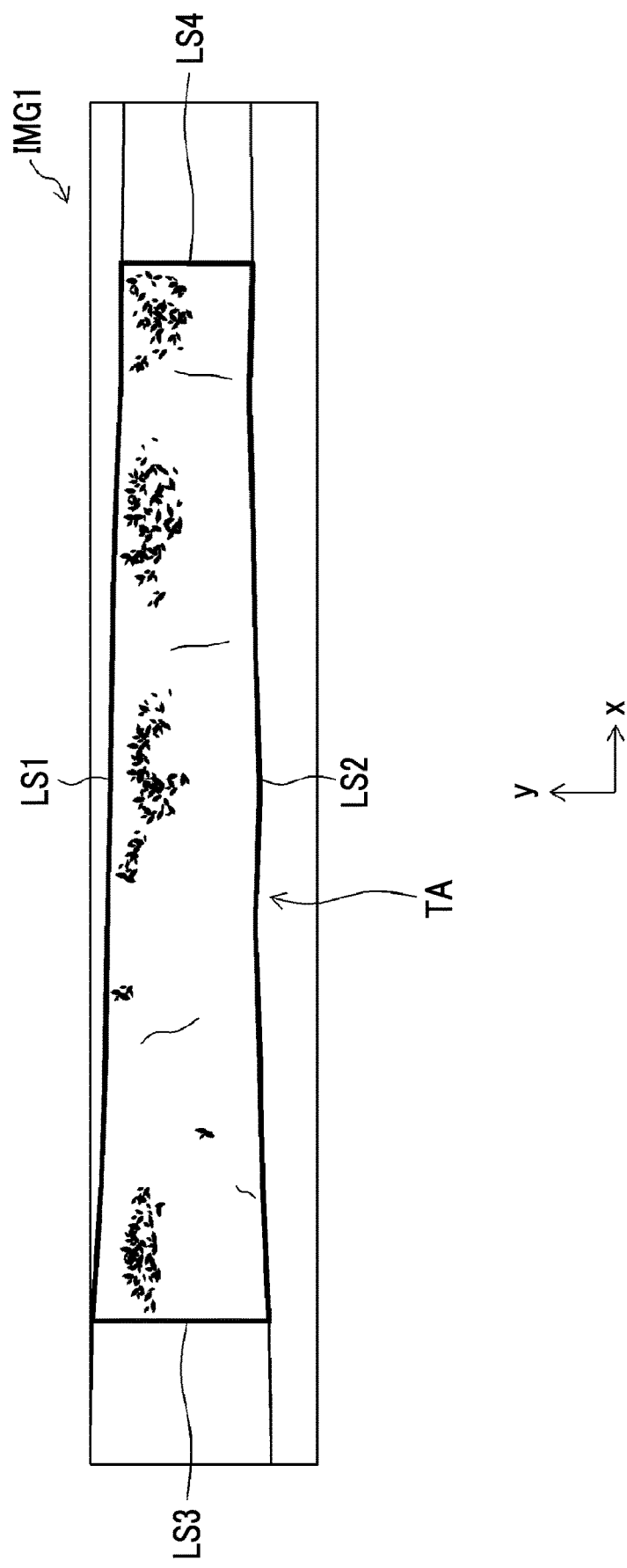
FIG. 6 is an illustrative diagram of a trace on the basis of the vertex designation.

Then, the area specifying unit 34 specifies a correction target area TA in the combined image corresponding to the rectangular area in the real space, on the basis of the vertex designation or the side designation received in step S6 (step S8). The area specifying unit 34 of the example traces an edge of the correction target area TA in the combined image IMG1 corresponding to the edge of the rectangular area in the real space on the basis of vertex designation, as illustrated in FIG. 6. When the side designation is received in step S6 and there is an undesignated side, the undesignated side is detected by tracing.

Figure 7:
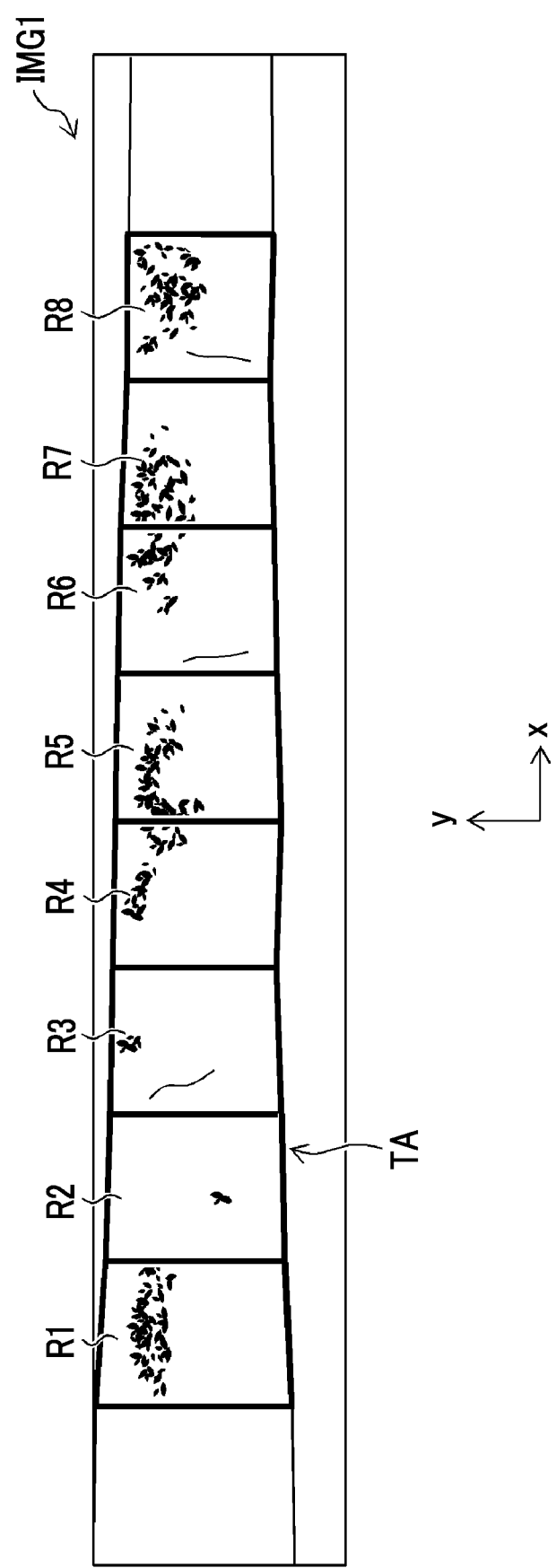
FIG. 7 is an illustrative diagram of division of a combined image.

Then, as illustrated in FIG. 7, the division unit 36 divides the correction target area TA in the combined image IMG1 into a plurality of divided areas R1, R2, R3, R4, R5, R6, R7, and R8 (step S10). In the example, the correction target area TA is divided into the divided areas R1 to R8 that are a plurality of quadrilaterals.

Figure 8:
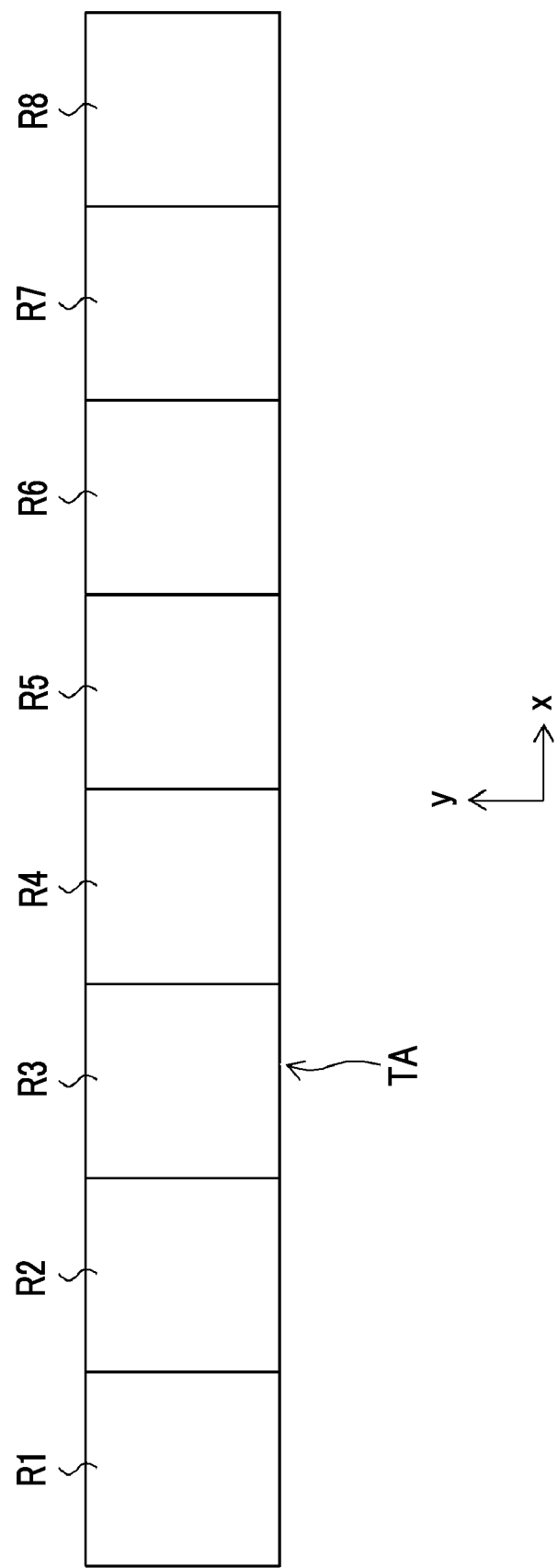
FIG. 8 is an illustrative diagram of geometric conversion of divided areas.
Figure 9:
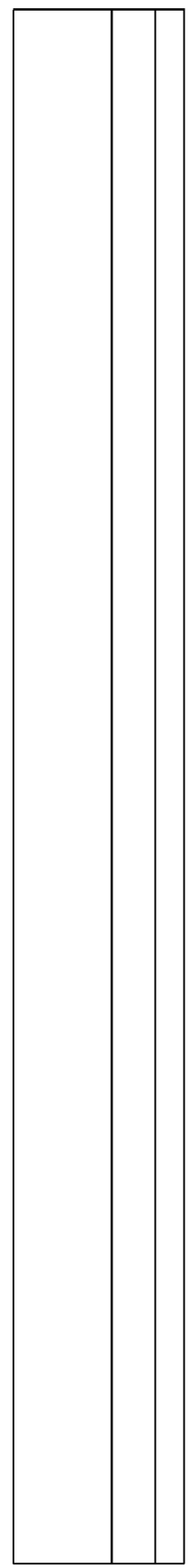
FIG. 9 is a diagram illustrating an example of a long subject that is used for description of a problem of the present invention.
Figure 10:
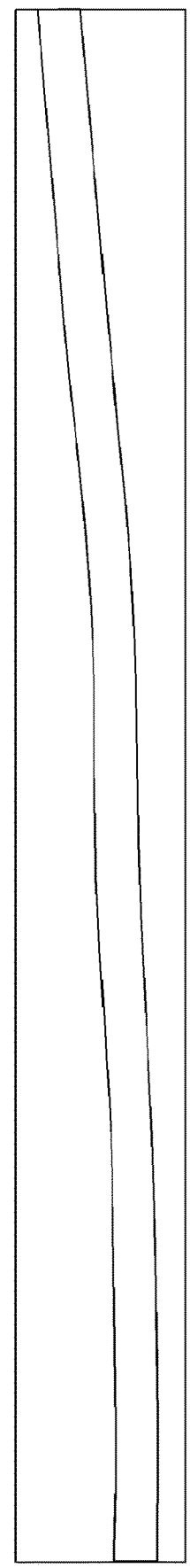
FIG. 10 is a diagram illustrating an example of a combined image that is used for description of the problem of the present invention.
Figure 11:
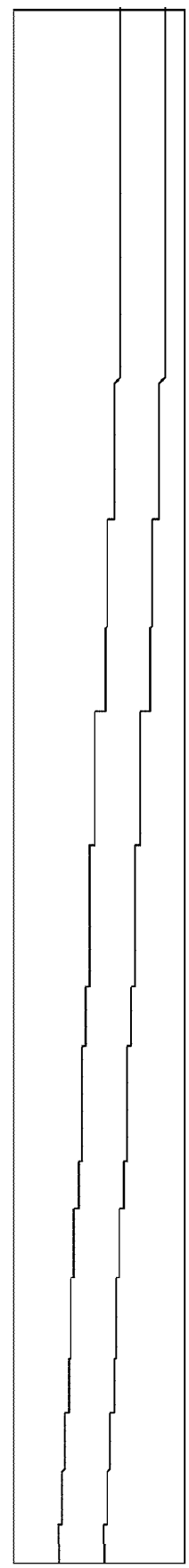
FIG. 11 is a diagram illustrating another example of the combined image that is used for description of the problem of the present invention.

Then, as illustrated in FIG. 8, the geometric conversion unit 40 converts each of the divided areas into a rectangle (step S12). In this example, the divided areas, which are quadrilateral, are converted into rectangles.

Then, the display control unit 32 displays the corrected combined image on the display screen of the display unit 24 (step S14).

Then, the corrected combined image is stored in the database 14 (step S16).

Various Aspects of Division of Correction Target Area

There are various aspects of division of the correction target area in the division unit 36.

First, there is an aspect in which divided areas are easily determined on the basis of at least one of the regularity of imaging conditions at the time of division imaging or the regularity of correction at the time of combination (at the time of connection).

In a case in which division imaging is performed in a longitudinal direction of a rectangular area with a distance from the imaging device 12 to the rectangular area (here, referred to as an "imaging distance") constant, the division unit 36 can equally divide the correction target area of the combined image in a longitudinal direction (which is an example of a specific direction) of the correction target area corresponding to the longitudinal direction of the rectangular area in some cases. However, when the imaging distance is constant and the division imaging is performed, not only the imaging distance but also the tilt angle (the angle between the imaging optical axis of the imaging device 12 and the rectangular area) is constant. Further, it is desirable for the rotation angle (which is an angle around the imaging optical axis of the imaging device 12) to be constant. Further, it is assumed that a size of a superimposed area (a pasting area) for connection between the partial images is also constant. Generally, when a size of a field of view at the time of imaging is constant, the imaging distance is also constant, and therefore, imaging conditions such as a case in which the division imaging is performed with the "imaging distance is constant" described above may be replaced with imaging conditions such as a case in which the division imaging is performed with "a size of field of view is constant". Further, "constant" includes substantially constant, that is, a fluctuation in a predetermined allowable range (for example, within 10%).

When a correction process (a distance correction process) in which a substantial imaging distance (or the size of field of view) in the combined image is made constant through correction before combination (before connection) is performed even in a case in which the imaging distance (or the size of field of view) at the time of division imaging is indefinite, the divided areas can be determined as in the case in which the imaging distance (or the size of field of view) at the time of division imaging is constant. In this case, it is assumed that not only the substantial imaging distance but also the substantial tilt angle is constant, that is, the "tilt correction" is performed before the combination.

Further, in a case in which divisional imaging is performed in the longitudinal direction of the rectangular area with different imaging distances, the division unit 36 divides the correction target area with a constant aspect ratio of an aspect (an X direction and a Y direction) of the divided areas. However, it is assumed that the tilt angle at the time of division imaging is constant, or the substantial tilt angle in the combined image is constant due to the tilt correction before combination (before connection). The division unit 36 of the example reduces a size of the divided area as the imaging distance is longer (or as the size of field of view is larger).

Second, there is an aspect in which a plurality of divided areas are determined according to the size of the partial image obtained by performing division imaging and the size of the superimposed area for connection (also referred to as a "pasting area"). For example, in FIG. 4, the partial image IMG11 includes the superimposed areas MA11 and MA12. Therefore, the division unit 36 sets a size (L1-L12) obtained by subtracting a size L12 in a longitudinal direction x of the superimposed area MA12 of one (for example, the right side) of right and left sides from a size L1 in the longitudinal direction x of the partial image IMG11 in the longitudinal direction x of the rectangular area, as the size of the divided area corresponding to the partial image IMG11. Similarly, for the other partial images IMG12 and IMG13, division areas are determined according to the size of the partial image and the size of the superimposed area. For example, information on the partial images and the superimposed areas (superimposed area information) and the combined image can be associated with each other and stored in the database 14, and the divided areas can be determined on the basis of the superimposed area information. The division unit 36 can divide the correction target area in the combined image into superimposed areas on the basis of the superimposed area information. For example, the correction target area can be divided with a line denoted by a reference sign BL in FIG. 4 as a boundary line.

Third, there is an aspect in which a plurality of divided areas are determined using geometric conversion information at the time of combination (at the time of connection). The combined image of this example is connected after the plurality of partial images are corrected through projective conversion (which is an aspect of "geometric conversion"). The division unit 36 in this aspect determines a plurality of divided areas on the basis of a projective conversion matrix (which is an example of the "geometric conversion information") used when the partial images are connected.

Fourth, there is an aspect in which a plurality of divided areas are determined on the basis of a result of tracing edges of the correction target area (which is an area corresponding to a rectangular area in a real space) in the combined image using the area specifying unit 34. In this aspect, when tracing on the basis of vertex designation (or edge designation) described with reference to FIG. 6 is performed, the area specifying unit 34 recognizes a shape of an edge of the correction target area, and determines a position and a size of each divided area on the basis of the recognized shape of the edge.

Further, an aspect of the division of correction target area may be implemented by combining the plurality of above-described aspects. Further, the aspect may be implemented in aspects other than the above-described aspect.

The processing unit 30 illustrated in FIG. 1 described above can include various processors as shown below. The various processors include a dedicated electric circuit that is a processor having a circuit configuration specially designed to execute a specific process of a programmable logic device (PLD), an application specific integrated circuit (ASIC), or the like, which are processors of which a circuit configuration can be changed after manufacture of a central processing unit (CPU), a field-programmable gate array (FPGA), or the like, which is a general-purpose processor that executes various processing by software (program). In the above embodiment, a function of the image correction device 10 may be realized by one of the various processors, or may be realized by two or more processors of the same or different types (for example, a plurality of FPGAs or a combination of a CPU and the FPGA). Further, a plurality of functions may be realized by one processor. An example in which the plurality of functions are realized in one processor includes an aspect in which a processor in which functions of an entire system including the plurality of functions are realized by an integrated circuit (IC) chip, a representative example thereof being a system on chip (SoC), is used. Thus, various functions are realized using one or more of the various processors described above as a hardware structure. Further, a hardware structure of the various processors is more specifically an electric circuit (circuitry) in which circuit elements such as semiconductor elements are combined.

Further, the image correction method described above may also be executed according to a program by a computer device. Further, the image correction device 10 of the above-described embodiment is only an example, and it is possible to apply the present invention to another configuration. Each functional configuration can be appropriately realized by arbitrary hardware, software, or a combination of both. For example, the present invention can also be applied to an image correction program that causes a computer to execute the process in each unit of the above-described image correction device 10, and a computer-readable recording medium (a non-transitory recording medium) recording such an image correction program.

The aspect for implementing the present invention has been described, but the present invention is not limited to the embodiment and modification example described above, and various modification can be made without departing from the gist of the present invention.

EXPLANATION OF REFERENCES

10: image correction device
12: imaging device
14: database
22: image acquisition unit
24: display unit
26: manipulation unit
28: storage unit
30: processing unit
32: display control unit
34: area specifying unit
36: division unit
40: geometric conversion unit
50: image combination device
IMG1: combined image
IMG11, IMG12, IMG13: partial image
MA1, MA12, MA13, MA14: superimposed area
R1, R2, R3, R4, R5, R6, R7, R8: division area
TA: correction target area
V1, V2, V3, V4: point corresponding to vertex of rectangular area

What is claimed is:

1. An image correction device comprising a processor configured to:
    acquire a combined image including a plurality of partial images, the partial images being obtained by performing division imaging on a rectangular area in a real space using an imaging device, the partial images being connected to form the combined image;
    display the acquired combined image on a display screen;
    receive, for the combined image displayed on the display screen, a designation indicating a vertex or at least two sides in the combined image respectively corresponding to a vertex or at least two sides of the rectangular area in the real space;
    specify a correction target area in the combined image on the basis of the received designation indicating the vertex or the at least two sides in the combined image respectively corresponding to the vertex or the at least two sides of the rectangular area in the real space;
    divide the correction target area into a plurality of divided areas, each of the divided areas being a quadrilateral;
    convert each of the plurality of divided areas into a rectangle; and
    display a corrected combined image on the display screen based on the converted rectangles.

2. The image correction device according to claim 1, wherein the processor is configured to trace an edge of the correction target area in the combined image corresponding to an edge of the rectangular area in the real space on the basis of the received designation indicating the vertex or the at least two sides.

3. The image correction device according to claim 2, wherein the processor is configured to divide the correction target area into the plurality of divided areas on the basis of a result of the trace.

4. The image correction device according to claim 1,
    wherein the combined image includes the plurality of partial images obtained by performing division imaging in a longitudinal direction of the rectangular area with a distance from the imaging device to the rectangular area or a size of field of view made constant, and
    the processor is configured to divide the correction target area in a specific direction of the correction target area corresponding to a longitudinal direction of the rectangular area.

5. The image correction device according to claim 1,
    wherein the combined image includes the plurality of partial images obtained by performing division imaging in a longitudinal direction of the rectangular area with a distance from the imaging device to the rectangular area or a size of a field of view made different, and the processor is configured to divide the correction target area with an aspect ratio of the plurality of divided areas made constant.

6. The image correction device according to claim 5, wherein the processor is configured to reduce a size of the divided area as the distance from the imaging device to the rectangular area increases or as the size of the field of view increases.

7. The image correction device according to claim 1,
wherein in the combined image, the plurality of partial images are connected to each other while being partially superimposed on each other so as to define superimposed areas, information on the partial images and the superimposed areas and the combined image, referred to as superimposed area information, are associated with each other and stored in a database, and the processor is configured to determine the divided area on the basis of the superimposed area information, whereby the divided areas are determined according to a size of the partial image and a size of a superimposed area for connection.

8. The image correction device according to claim 7, wherein the processor is configured to divide the correction target area within the superimposed area of the partial image.

9. The image correction device according to claim 1,
wherein in the combined image, the plurality of partial images are geometrically converted and connected, and the processor is configured to determine the plurality of divided areas on the basis of geometric conversion information used in the geometric conversion in the connection.

10. An image correction method comprising steps of:

acquiring a combined image including a plurality of partial images, the partial images being obtained by performing division imaging on a rectangular area in a real space using an imaging device, the partial images being connected to form the combined image;

displaying the acquired combined image on a display screen;

receiving, for the combined image displayed on the display screen, a designation indicating a vertex or at least two sides in the combined image respectively corresponding to a vertex or at least two sides of the rectangular area in the real space;

specifying a correction target area in the combined image on the basis of the received designation indicating the vertex or the at least two sides in the combined image respectively corresponding to the vertex or the at least two sides of the rectangular area in the real space;

dividing the correction target area into a plurality of divided areas, each of the divided areas being a quadrilateral;

converting each of the plurality of divided areas into a rectangle; and displaying a corrected combined image on the display screen based on the converted rectangles.

11. A non-transitory, computer-readable tangible recording medium which records a program for causing a computer to perform steps of:

acquiring a combined image including a plurality of partial images, the partial images being obtained by performing division imaging on a rectangular area in a real space using an imaging device, the partial images being connected to form the combined image;

displaying the acquired combined image on a display screen;

receiving, for the combined image displayed on the display screen, a designation indicating a vertex or at least two sides in the combined image respectively corresponding to a vertex or at least two sides of the rectangular area in the real space;

specifying a correction target area in the combined image on the basis of the received designation indicating the vertex or the at least two sides in the combined image respectively corresponding to the vertex or the at least two sides of the rectangular area in the real space;

dividing the correction target area into a plurality of divided areas, each of the divided areas being a quadrilateral; and converting each of the plurality of divided areas into a rectangle; and displaying a corrected combined image on the display screen based on the converted rectangles.

* * * * *